United States Patent Office 2,876,740
Patented Mar. 10, 1959

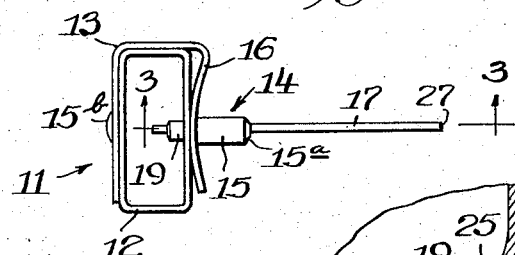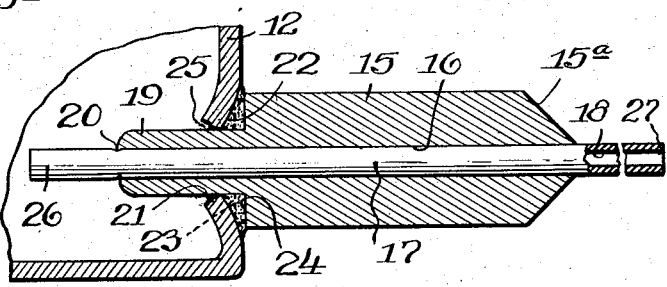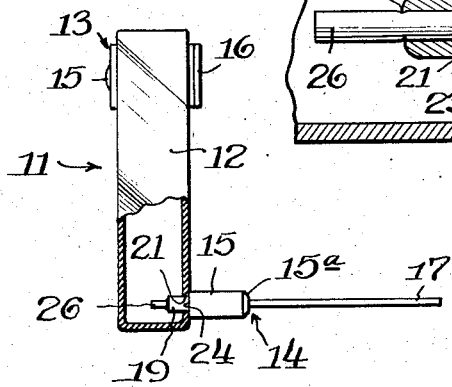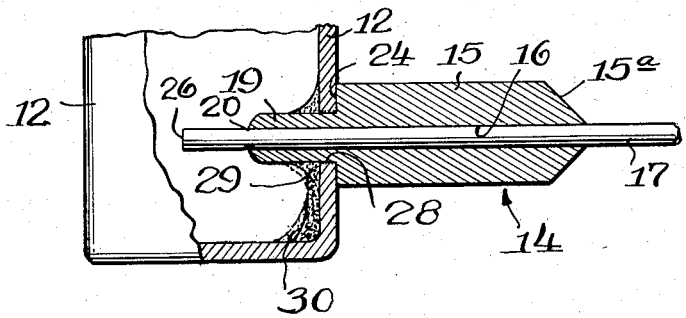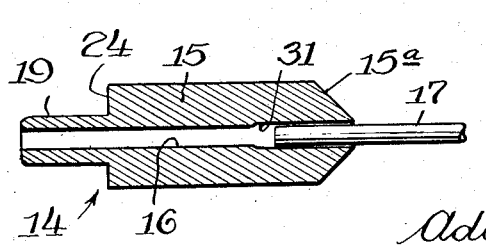
Inventor,
Adalbert Melas,
By: Jones, Darbo & Robertson,
Attys.

2,876,740

RECORDER PEN ASSEMBLY

Adalbert Melas, Bala-Cynwyd, Pa., assignor to Burgess-Manning Company, Libertyville, Ill., a corporation of Illinois Application September 7, 1956, Serial No. 608,511

1 Claim. (Cl. 120—42.06)

This invention relates to a recorder pen assembly such as may be employed in so-called box pens for use in chart recording instruments, such as temperature and pressure recorders.

Such an assembly generally comprises a box serving as a reservoir for ink and a pen for conducting ink from the reservoir for scribing on the chart. In prior assemblies, the pen element was formed by machine operations both at its inlet and outlet portions, thus frequently resulting in the formation of burrs which, together with the coagulation thereat of a slight amount of ink, served to clog up the ink passageway through the pen, thus incapacitating the unit. Also, the several machine operations and necessary detailed inspection made the prior structures costly and difficult of manufacture.

One object of the present invention is to provide a pen assembly for a recording instrument that minimizes machining operations and that uses certain commercially available parts. Another object of the invention is to provide a pen assembly that is relatively cheap to manufacture and that does not require excessively detailed inspection. A still further object of the invention is to provide a pen assembly which is readily cleanable and in which the ink conduit from the reservoir to the pen nib does not readily clog.

The invention contemplates both structure and method.

These and other objects will be apparent from the following description, taken together with the accompanying drawing of an illustrative embodiment of the invention, and in which drawing Figure 1 is a top plan view of a box pen assembly embodying the invention;

Figure 2 is a side elevational view, partially in section, of the embodiment of Fig. 1;

Figure 3 is an enlarged cross-sectional view taken on the line 3—3 of Fig. 1, the box being shown broken away;

Figure 4 is a sectional view somewhat similar to Fig. 3 but showing a modification of the invention; and Figure 5 shows a step in the preferred assembly.

Referring in detail to the illustrative construction shown in the drawing, the assembly 11 comprises a rectangular box-shaped reservoir 12, for the recording ink, that is provided near its top with a mounting strap 13 and near its bottom with a pen assembly 14. In accordance with usual practice well known to the art, the mounting strap 13 includes a spring mounting clip 16 that serves to mount the assembly at the outer end of a pen-carrying movable arm of a recorder instrument. Soldering, as at 15b may serve to fix the strap 13 to the reservoir 12, a suitable perforation, not shown, being provided in the strap to give the solder access to the reservoir body. The reservoir box 12 is provided with an opening adjacent its lower end through which the pen assembly is mounted so as both to cause the pen assembly to be carried by the reservoir and also to provide communication for ink from the reservoir to the pen.

In accordance with the present invention, the pen assembly 14 comprises a cylindrical metal bushing 15 having a through bore 16 formed therein and into which is entered a small and fine diameter tube 17, the tube 17 being desirably snugly but not tightly received in the bore 16 whereby the tube may be moved easily within the bushing during assembly of the pen structure.

The tube 17 is advantageously and economically provided by a section of appropriate length of commercial stainless steel hypodermic needle tubing readily available on the market and having the usual capillary passageway 18 therethrough. The bushing 15 is desirably tapered, as at 15a, toward the tube 17.

Further in accordance with the present invention, the bushing 15 has an inner end 19 of reduced diameter and the reduced end 19 is crimped or peened by means of a suitable tool about the tube 17, as at 20, to maintain the tube and bushing in fixed assembly, with the tube projecting from the bushing at each end.

Next, and still further in accordance with the present invention, the reduced end 19 of the bushing 15 is passed through a substantially corresponding circular opening 21 in the lower end of the reservoir 12, extending laterally therefrom.

As shown in Fig. 3, the opening 21 is formed in this instance by piercing the wall of the reservoir box 12 from the exterior thereof, advantageously leaving a somewhat conical cavity 22 in the outer surface of the reservoir wall. Before the bushing is passed into the opening 21 a solder ring or washer 23 is placed on the reduced end 19 of the bushing abutting the shoulder 24 thereof where the bushing is enlarged, and, upon suitable heating of the entire assembly, the solder washer 23 is fused and solder flows into the conical cavity 22 to provide a tight joint at the opening 21 and to hold the bushing in fixed relation with the reservoir box. The displaced edge of the opening 21, as at 25 on the inner face of the reservoir wall, provides an additional securement means by encircling the reduced end 19 of the bushing.

So constructed and arranged, the tube 17 provides at its inner end 26 an ink barrel for the pen assembly 14 while the outer end 27 of the tube 17 provides the nib or point of the pen. It will be understood that the tube 17 is of sufficiently small diameter, both internally and externally, so that the ink will not flow therein except when the point 27 is pressed against the record chart surface of the recording instrument and that the lines made thereby are of suitable fineness.

In the modification illustrated in Fig. 4, the opening in the reservoir box is shown as a drilled formation 28 in which case the shoulder 24 on the bushing abuts squarely against the reservoir wall margining the hole 28 and solder 29 may be applied internally to the inner face of the reservoir wall. In the use of this embodiment a mass of solder 30 is placed in the lower portion of the box and after the bushing is inserted in the opening 28 the box is tilted so that upon the application of a suitable degree of heat, the solder runs around the bushing at its point of entry into the box.

In accordance with a preferred practice of the invention, and as best seen in Fig. 5, the bushing bore 16 may be slightly counterbored as at 31 at its outer end and the tube 17 is desirably entered initially into this counterbore and is then pushed into final position as shown in Figs. 3 and 4, thus providing a guide for the entry of the tube into the bore 16 and facilitating assembly.

Different lengths of hypodermic needle tubing may be used in order to obtain different lengths of pen nibs, thus providing a series of pen assemblies that may be mounted adjacent a common pivot point in the recording instrument while permitting the desired individual pen movements, the nibs by their different lengths permitting the pens to pass by each other while maintaining their individual contact with the record chart sheet.

The pen assembly here disclosed avoids the likelihood of burrs being formed either at the inlet or barrel end of the pen or at the outlet or nib end, thus eliminating a major fault of prior pen structures which were machined throughout. The nib end may be made of any desired length by simply scoring and breaking the commercially available hypodermic needle tubing as if one were scoring and breaking glass. Furthermore, inspection of the pen bore, a tedious and expensive procedure indispensable to prior pen structures, is not needed since no operations are performed in assembling which would result in the formation of burrs to block the passageway. The pen is readily cleanable by simply inserting a thin wire into the passageway 18 and passing the wire therethrough end to end. By the employment of the readily available hypodermic tubing a more uniform product is insured providing very fine inking lines and at the same time the cost of manufacture is reduced by as much as two-thirds.

Such changes may be made as fall within the scope of the appended claim without departing from the invention.

What is here claimed is:

A recorder pen assembly comprising, a bushing having a tapered point at one end and a reduced cylindrical portion at its other end, a right angular shoulder at the juncture of said reduced portion and the main portion of the bushing said bushing having a bore therethrough, and a fine diameter metallic tube in said bore and projecting from the bushing at both ends, the bore of the bushing being slightly larger adjacent said tapered end than at said reduced end, the bore enlargement terminating short of said shoulder, whereby the tube is entered into the bushing at the tapered end of the bushing and is held in fixed assembly therewith by a reduction in said bore at the reduced end of the bushing said tube being a section of hypodermic needle tubing, said tube at the tapered end of the bushing providing a pen nib and the shoulder at the reduced end of the bushing providing a normally transverse abutment for mounting the assembly into an opening in an ink box.

References Cited in the file of this patent
UNITED STATES PATENTS

| | | |
|---|---|---|
| 1,064,754 | MacGahan | June 17, 1913 |
| 1,993,398 | Cislak | Mar. 5, 1935 |
| 2,378,098 | Piron | June 12, 1945 |
| 2,423,924 | Augenstein et al. | July 15, 1947 |
| 2,665,689 | Butler | Jan. 12, 1954 |

FOREIGN PATENTS

| | | |
|---|---|---|
| 347,250 | Great Britain | Apr. 20, 1931 |